Figure 1:
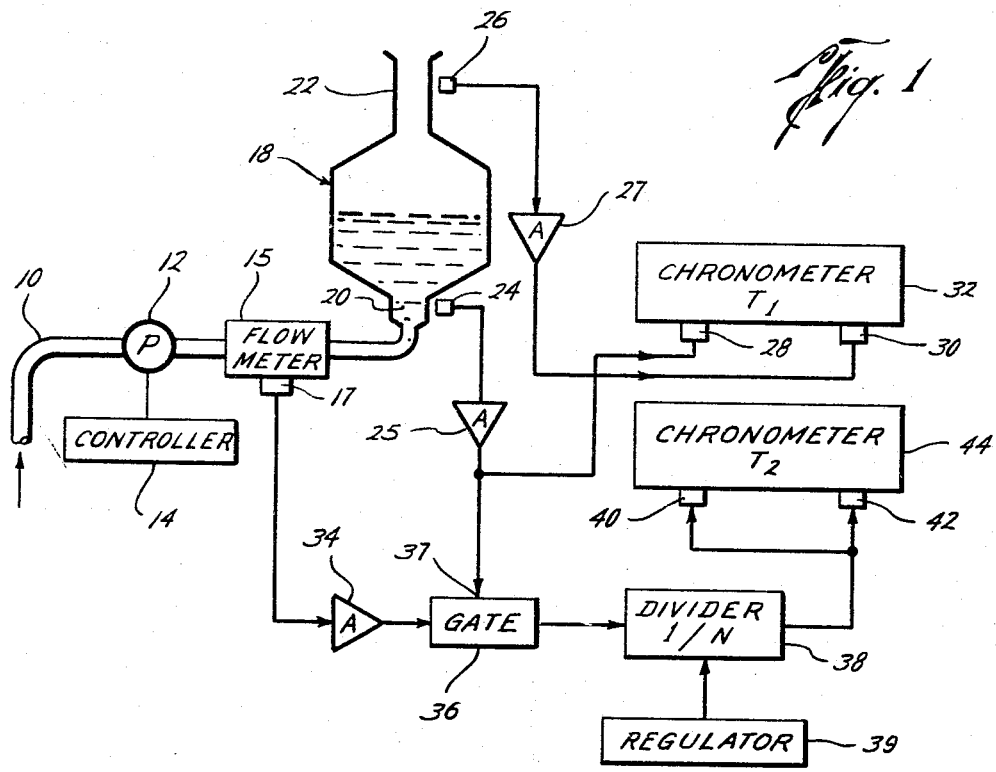

Roger Charbonnier
INVENTOR.

3,324,707
METHOD AND APPARATUS FOR CALIBRATING
FLOW METERS
Roger Charbonnier, Meudon, France, assignor to Societe
Rochar Electronique, Montrouge, Seine, France, a corporation of France
Filed Mar. 25, 1965, Ser. No. 442,681
Claims priority, application France, Apr. 2, 1964,
969,575
3 Claims. (Cl. 73—3)

This invention relates to an improved method and apparatus for calibrating fluid flow meters and more specifically to fluid flow meters which provide electric signals whose number is proportional to the metered volume of fluid. Meters of this kind typically have a free helix on which is mounted a permanent magnet whose relative rotation with respect to an adjacently disposed detecting coil generates the electric signals.

Even though a flow meter may be carefully calibrated in the laboratory against known standards, it often loses its accuracy after a period of time in operation. To recalibrate the flow meters, certain methods have been proposed in the past. One such known method uses a volumetric gauge whose form may be of any shape but which encloses an exactly known volume of liquid between two predetermined datum levels. Thus, for example, in the case of a vertical gauge, the arrival of the liquid at each of the two datum levels is detected by a liquid level sensor which supplies an electric pulse at the instant when the level is passed. To carry out the calibration of the flow meter, on the one hand the number of pulses delivered during the interval of time which separates the two pulses supplied by the first and second sensors are counted. On the other hand, the lapse of time between the two pulses is also measured. As the volume of the gauge is known very accurately, it is possible to calibrate the flow meter.

Such a method, however, has the disadvantage of requiring a relatively large volume gauge. In effect, the pulse counters utilized in such a method yield an error of at least one unit, since there is no known phase relationship between the signals delivered by the flow meter under calibration and the control pulses for starting and stopping the counters actuated by the liquid level detectors associated with the volumetric gauge. It follows that the minimum volume for obtaining reliable calibration is inversely proportional to the constant C of the flow meter under calibration, where C is the number N of electric signals produced per unit of volume of liquid flow. It will, therefore, be apparent that in the case, for example, where it is desired to obtain a calibration accuracy of $10^{-4}$ for a flow meter whose theoretical constant $C_0=2$ signals per liter, it is necessary to use a gauge having a volume of five cubic meters. Such a large gauge is prohibitive for most applications.

It is, therefore, the main object of this invention to provide a new and improved method and apparatus for calibrating flow meters which method permits the use of a volumetric gauge of reduced volume without sacrificing accuracy.

According to the invention, there is provided a method and apparatus for calibrating flow meters by means of a gauge of known volume V, the gauge having a first and second datum level detector associated therewith and a chronometer adapted to measure the time $T_1$ between the pulses supplied by the two level detectors. Simultaneously, a time interval $T_2$ taken by the flow meter under test to deliver a number N of signals is also measured. Then a function of $T_1$ and $T_2$ is measured. This function then yields the exact characteristic parameter of the flow meter, i.e., by virtue of this method, the comparison of the times $T_1$ and $T_2$, which can be obtained with very high accuracy, provides the desired characteristic parameter of the flow meter under calibration to a very high accuracy.

The preferred embodiment for carrying out this method comprises means including a first chronometer for measuring $T_1$ and means for measuring $T_2$ taken by the flow meter under calibration to deliver a predetermined number N of pulses. These means include an electronic gate whose opening is controlled by a first level detector associated with the gauge. The input to the gate is connected to the output wires of the flow meter under calibration. The output signals from the gate are applied to the input of a divider stage having a factor N and the output signals from the divider control the starting and stopping of a second chronometer.

By virtue of this arrangement, by suitable regulation of the starting state of the binary counters in the divider stage, it is possible to start the second chronometer on the first pulse supplied by the flow meter after the first level detector has operated. After the divider stage has received N pulses from the flow meter, the divider stage supplies a second pulse which causes the stopping of the second chronometer. The desired parameter of the flow meter is then derived as a function of $T_1$ and $T_2$.

Figure 2:
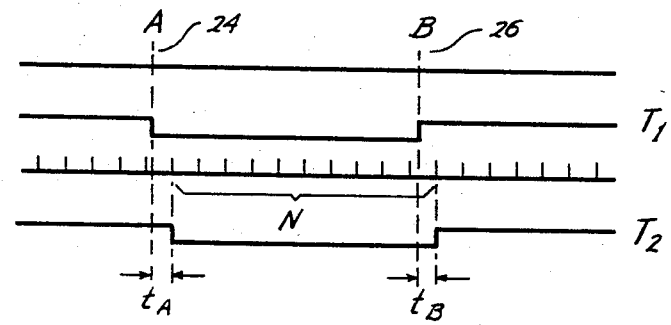

This invention, its objects and advantages will become clear from the following description when taken with reference to the accompanying drawings in which:

FIG. 1 represents a schematic layout of a calibration arrangement for flow meters in accordance with this invention; and FIG. 2 shows the time relationship between certain electric signals appearing at different points in the arrangement of FIG. 1.

In FIG. 1, there is shown a calibration arrangement comprising a conduit 10 connected to a supply not shown. In the conduit 10 is disposed an electric pump 12 provided with a controller 14. The pump 12 feeds a flow meter 15 which typically includes a free helix whose hub is equipped with a magnet. The flow meter 15 additionally comprises a coil 17 in which are induced electric signals by the rotation of the magnet. Such flow meters are characterized by a parameter specified by the number of signals generated in the coil 17 per unit of volume of liquid flowing through the meter 15. To illustrate the calibration technique, it will be assumed thereinafter that the meter 15 under calibration has a characteristic parameter $C_0=16$ signals per liter of liquid.

At the output of meter 15, the liquid put in motion by the pump 12 passes into a volumetric gauge 18 disposed vertically. The lower and upper poritons of the gauge 18 are provided with glass tubes 20 and 22 forming two constrictions. Opposite the constrictions 20 and 22 are respectively disposed two level detectors 24 and 26, preferably of the photoelectric type. Each detector is adapted to supply an electric signal as soon as the height of the liquid in the gauge 18 passes the datum level opposite the detector. Again, for purposes of illustration, the volume V of the liquid contained between the two datum levels is chosen to be ten liters ($V=10$). The output signals from the detectors 24 and 26 are applied respectively to the inputs of two amplifying and shaping circuits 25 and 27 whose outputs are respectively connected to the starting input 28 and the stopping input 30 of a first electronic chronometer 32. The time interval between the starting signal applied to the input 28 and the stopping signal applied to the input 30 is $T_1$ which is measured very accurately by the chronometer 32.

The output of the coil 17 of the flow meter 15 under calibration is connected to the input of an amplifier 34 for amplifying the signals generated in the coil 17. The output signals from the amplifier 34 are fed into an electronic gate 36. The gate 36 is opened in response to the signal provided by the amplifier 25 following the level detector 24. When the gate 36 is open, it allows for the passage of the signals from the amplifier 34 which signals are fed into a divider stage 38 having a division factor of N. For the paramters above given N is selected as being 160. The output signals of the divider stage are simultaneously applied to the inputs 40 and 42 respectively controlling the stopping and the starting of a second electronic chronometer 44 identical to the chronometer 32. To control the initial state of the divider stage 38, there is provided a regulator 39.

Referring to FIG. 2, on the first line are shown signals A and B, respectively supplied by the level detectors 24 and 26. On the second line is indicated the time duration $T_1$ as measured by the chronometer 32. The third line represents the electric signals generated by the coil 17 and supplied to the gate 36. The fourth line represents a square wave of time duration $T_2$ whose instant of starting is on the first pulse provided by the meter 15 which follows the appearance of the pulse A on the input 37 of gate 36, and whose instant of termination takes place after 160 pulses pass through gate 36. In operation, when the pump 12 is caused to turn by the controller 14 at the predetermined speed, the liquid passes through the conduit 10 to the gauge 18, the helix of the flow meter 15 turns and a train of pulses appears at the output line of the detecting coil 17 (see the third line in FIG. 2). As soon as the surface of the liquid in the constriction 20 passes the datum level adjacent the detector 24, the pulse A is supplied. This pulse starts the chronometer 32 and opens the gate 36. In operating the controller 39, it is arranged that the binary counters in the divider stage 38 stand in such settings that the first pulse which follows the opening of the gate 36 resets the counters to zero. In this manner, the first pulse provided by the amplifier 34 which follows the pulse A will institute the starting of the second chronometer 44.

When the surface of the liquid passes the second datum level adjacent the detector 26, the pulse B is provided which causes the chronometer 32 to stop. The chronometer 32 then provides a reading of $T_1$ seconds. On the other hand, after 160 pulses have passed through the gate 36, the divider stage 38 provides a second pulse to stop the chronometer 44. The chronometer 44 then provides a reading of $T_2$ seconds.

Before the flow meter 15 is set into operation, it is known to have a characteristic parameter, which indicates the number of pulses that coil 17 can provide per unit of volume. This parameter will be called the theoretical characteristic parameter $C_0$. In accordance with this invention, the exact characteristic parameter C is measured by measuring the time intervals $T_1$ and $T_2$. It can be shown that $C/C_0$ is proportional to $T_1/T_2$. The quotient $T_1/T_2$ can be calculated. On the other hand and preferably, this quotient can be obtained by applying the outputs from the chronometers 32 and 34 to a computer not shown which will automatically yield the desired computation.

If the number N has been chosen sufficiently large, the errors due to variations of phase between the pulses supplied by the flow meter 15 in accordance with the exact position of the helix in the flow meter are negligible. On the other hand, when the two time intervals $T_1$ and $T_2$ are not rigorously synchronous, it is necessary that the flow rate of the liquid during the measurement be identical during the time intervals $t_A$ and $t_B$ which respectively separate the instants of starting and stopping of the clocks 32 and 44 (see line 4, FIG. 2). If the relative variation in the flow rates at the times $t_A$ and $t_B$ is called $\Delta D$, the maximum error $e$ arising is $e = \Delta D/N$. The value $N = 160$ is sufficient for a variation of a few percent between the instantaneous flow rates during the intervals $t_A$ and $t_B$ and does not lead to any appreciable errors. Because the times $T_1$ and $T_2$ can be measured with a very high degree of precision by the electronic chronometers 32 and 44, the exact characteristic parameter C of the flow meter 15 under calibration can be determined with a very high degree of precision as a function of $T_1$ and $T_2$.

It will be appreciated that the arrangement according to the invention also permits the tracing of the calibration curve for the flow meter 15 as a function of different flow rates imposed on the liquid by the pump 12. It will clearly be understood that the invention is not limited to the arrangement given above and may, on the contrary, be subjected to various modifications. Thus, V, $C_0$ and N may take various values. However, N should be chosen to be larger than 100 so as to reduce the errors due to phase variations between the signals supplied by the flow meter 15. In addition, in the case of flow meters with multiple magnets, or magnets with multiple poles, N should be chosen as an integral multiple of the number of pairs of poles or the equivalent magnets so that the control pulses for stopping and starting the chronometer 44 are supplied by the same magnet.

While I have illustrated and described the best forms of preferred embodiments of my invention, it will be apparent to those skilled in the art that changes may be made in the form of the apparatus without departing from the spirit of my invention as set forth in the appended claims.

What is claimed is:

1. A method for determining the characteristic parameter C of a flow meter of the type which supplies a number of electric signals proportional to the volume of fluid flowing through the flow meter, said method comprising the steps of feeding the output of said flow meter to a gauge of known volume V, generating a starting signal when the liquid in the gauge passes a first datum level, generating a stopping signal when the liquid in the gauge passes a second datum level, measuring a first time interval $T_1$ between said stopping and starting signals, measuring a second time interval $T_2$ taken by said flow meter to supply a number N of signals, and calculating the characteristic parameter C of said flow meter as a function of said time intervals $T_1$ and $T_2$.

2. In a system for calibrating a flow meter of the type which supplies electrical signals proportional to the volume of fluid flowing therethrough, means including a gauge of known volume, a first and a second level detector both associated with said gauge for respectively providing starting and stopping signals when said liquid reaches a first predetermined level and a second predetermined level, the time interval between said starting and stopping pulses being $T_1$, and means coupled to said flow meter for measuring a time interval $T_2$ taken by said flow meter to supply a number N of signals, whereby the characteristic parameter of said flow meter may be calculated as a function of said time intervals $T_1$ and $T_2$.

3. A calibrating apparatus for determining the exact characteristic parameter of a flow meter, said apparatus comprising: a gauge having a known volume V between two predetermined datum levels, means including said flow meter for supplying liquid to said gauge at a substantially constant flow rate; means for detecting the passage of said liquid past said first datum level and for supplying a first electric signal; means for detecting the passage of said liquid past said second datum level and for supplying a second electric signal, the time separation between said first and second electric signals being $T_1$; means coupled to said flow meter and being responsive to said first electric signal for measuring a time interval $T_2$ taken by the flow meter to supply a number N of electric pulses, whereby said exact characteristic parameter may be calculated as a function of said time intervals $T_1$ and $T_2$.

References Cited

UNITED STATES PATENTS 3,092,991  6/1963  Thompson _____ 73—3

LOUIS R. PRINCE, *Primary Examiner.*

S. C. SWISHER, *Assistant Examiner.*